US008027512B2

(12) United States Patent
Jaspers et al.

(10) Patent No.: US 8,027,512 B2
(45) Date of Patent: Sep. 27, 2011

(54) METHOD AND SOFTWARE PROGRAM FOR SEARCHING IMAGE INFORMATION

(75) Inventors: Egbert Jaspers, Well (NL); Rob Albers, Nijmegen (NL); Rob Wijnhoven, Eindhoven (NL)

(73) Assignee: Robert Bosch GmbH, Stuttgart (DE)

( * ) Notice: Subject to any disclaimer, the term of this patent is extended or adjusted under 35 U.S.C. 154(b) by 1318 days.

(21) Appl. No.: 10/592,814

(22) PCT Filed: Sep. 30, 2005

(86) PCT No.: PCT/EP2005/054963
§ 371 (c)(1),
(2), (4) Date: Sep. 14, 2006

(87) PCT Pub. No.: WO2007/038986
PCT Pub. Date: Apr. 12, 2007

(65) Prior Publication Data
US 2008/0243774 A1  Oct. 2, 2008

(51) Int. Cl.
*G06K 9/00* (2006.01)
*G06K 9/66* (2006.01)
*G06K 9/62* (2006.01)
*G06F 17/30* (2006.01)

(52) U.S. Cl. ........ 382/103; 382/107; 382/181; 382/190; 382/209; 707/E17.014; 707/E17.018; 707/E17.024; 707/E17.028

(58) Field of Classification Search ............... 382/103, 382/107, 181, 190, 209; 707/E17.014, E17.018, 707/E17.024, E17.028
See application file for complete search history.

(56) References Cited

U.S. PATENT DOCUMENTS
6,366,701 B1 * 4/2002 Chalom et al. ............ 382/236
(Continued)

FOREIGN PATENT DOCUMENTS
EP   1 418 546   5/2004
(Continued)

OTHER PUBLICATIONS

Hsu, Chiou-Ting, et al. "Motion Trajectory Based Video Indexing And Retrieval." Image Processing. 2002. Proceedings. 2002 International Conference on. 1. (2002): 605-608. Print.*

(Continued)

*Primary Examiner* — Matthew Bella
*Assistant Examiner* — Michael A Newman
(74) *Attorney, Agent, or Firm* — Michael J. Striker

(57) ABSTRACT

Video systems are widely used in the field of surveillance of buildings, traffic, private homes, supermarkets and the like. For some applications it is useful to save the video information for a later access or analysis. As the saved data volume increases with the number of video cameras of a video system and the recorded time there is a need for video databases, which allow a fast searching for relevant video information. A method for searching image information comprising the steps of: extracting a trajectory of an interesting object in a picture frame sequence, whereby the trajectory is represented by a first set of location points in the picture frames, pre- processing the extracted trajectory to a pre-processed trajectory by applying a spatial correlation filter algorithm, which reduces the number of location points, whereby the pre-processed trajectory is represented by a second set of location points in the picture frames, storing the pre-processed trajectory in a database and applying search queries on the pre-processed trajectory data of the database and a respective software program is proposed.

11 Claims, 6 Drawing Sheets

U.S. PATENT DOCUMENTS

| | | | |
|---|---|---|---|
| 6,587,574 B1 * | 7/2003 | Jeannin | 382/107 |
| 6,643,387 B1 * | 11/2003 | Sethuraman et al. | 382/107 |
| 6,895,329 B1 * | 5/2005 | Wolfson | 701/209 |
| 7,072,398 B2 * | 7/2006 | Ma | 375/240.16 |
| 2001/0040924 A1 * | 11/2001 | Hori et al. | 375/240.16 |
| 2003/0126622 A1 | 7/2003 | Cohen et al. | |
| 2004/0027242 A1 * | 2/2004 | Venetianer et al. | 340/555 |
| 2006/0066719 A1 * | 3/2006 | Haering et al. | 348/143 |

FOREIGN PATENT DOCUMENTS

| | | |
|---|---|---|
| EP | 1418546 A1 * | 5/2004 |
| WO | 00/45338 | 8/2000 |
| WO | 2005/050971 | 6/2005 |

OTHER PUBLICATIONS

Faloutsos, Christos, et al. "Fast Subsequence Matching in Time-Series Databases." ACM SIGMOD. 23.2 (1994): 419-429. Print.*

Chang, Shih-Fu, et al. "A Fully Automated Content-based Video Search Engine Supporting Spatiotemporal Queries." IEEE Transactions on Circuits and Systems for Video Technology. 8.5 (1998): 602-615. Print.*

Chen, William, et al. "Motion Trajectory Matching of Video Objects." Storage and Retrieval for media databases, Conference. 3972. (2000): 544-553. Print.*

Keogh, et al. "A Simple Dimensionality Reduction Technique for Fast Similarity Search in Large Time Series Databases." PADKK '00 Proceedings of the 4th Pacific-Asia Conference on Knowledge Discovery and Data Mining, Current Issues and New Applications. (2000): 1-12. Print.*

Chiou-Ting Hsu et al: "Motion Trajectory Based Video . . . " Proceedings 2002 International Conference on Image Processing. ICIP 2002, Rochester, NY Sep. 22-25, 2002, pp. I-605-I-608 (in English).

Faisal I. Bashir et al: "Segmented Trajectory Based . . . " Proceedings 2003 International Comference on Image Processing. ICIP-2003, Barcelona, Spain, Sep. 14-17, 2003, pp. II-623-II626 (in English).

Weiming Hu et al: "A Survey on Visual Surveillance . . . " IEEE Transactions on Systems, Man, and Cybernetics—Part C: Application and Reviews, vol. 34, No. 3, Aug. 2004, pp. 334-352 (in English).

Eamonn J. Keogh et al: "A Simple Dimensionality Reduction Technique for Fast . . . " Proceeding of the 4th Pacific-Asia Conference on Knowedge Discovery and Data Applications, 2000, pp. 122-133 (in English).

Norbert Beck Mann et al: "The R*-Tree: An Efficinet Robust Access . . . " 1990 ACM SIGMOD International Conference on Manegement of Data, vol. 19, No. 2 Jun. 1990, pp. 322-331 (in English).

Jaspers et al: "Candela-Storage, Analysis and . . . " IEEE Jul. 6, 2005.

* cited by examiner

US 8,027,512 B2

METHOD AND SOFTWARE PROGRAM FOR SEARCHING IMAGE INFORMATION

TECHNICAL FIELD OF THE INVENTION

This invention relates to a method and a software program for searching image information and more specifically to a method and a software program for searching image information for surveillance purposes.

BACKGROUND OF THE INVENTION

Video systems are widely used in the field of surveillance of buildings, traffic, private homes, supermarkets and the like. For some applications it is useful to save the video information for a later access or analysis. As the saved data volume increases with the number of video cameras of a video system and the recorded time there is a need for video databases, which allow a fast searching for relevant video information.

Document WO 00/45338 discloses a system and method for representing trajectories of moving objects for content-based indexing and retrieval of visual animated data. The system allows identifying a selected object in a sequence of visual animated data frames and determining a trajectory of the selected object in a two dimensional or three dimensional coordinate space. In a next step high-level descriptors, which represent the trajectory of the object are created and merged with the original sequence of visual animated data thereby creating a "new signal". The new signal may be searched by matching the trajectory information stored in the descriptor with trajectory describing criteria selected for example by a user.

Document WO 2005/050971 A2 discloses a video surveillance system using virtual tripwires of arbitrary shape. The video surveillance system comprises a sensing device like a video camera and a computer system. The tripwires are drawn by a user on a video image captured by the video camera and trigger in case a tripwire rule is fulfilled a specific reaction of the video surveillance system. The video data captured by the video camera can be processed on-line or off-line. In all cases the tripwire-rules are applied on the video data.

SUMMARY OF THE INVENTION

The present invention proposes a method for searching picture image information with the features of claim 1 and a respective computer program with the features of claim 10. Preferred embodiments of the invention are defined by the features in the dependent claims and the description.

According to claim 1 the method comprises the steps of extracting a trajectory of an interesting object in a picture frame sequence, pre-processing the extracted trajectory to a pre-processed trajectory, storing the pre-processed trajectory as data in a database and applying search queries on the pre-processed trajectory data of the database.

The method further comprises a step of extracting a trajectory of an interesting object in a picture frame sequence, whereby the trajectory is represented by a first set of location points in the picture frames. The interesting object is for example a vehicle in traffic, a ball in a game, a person in a supermarket or the like. Preferably the picture frame sequence is analysed on-line, especially in real-time. Alternatively the picture frame sequence is recorded earlier and processed off-line. The term "picture frame sequence" comprises the meaning of video frame sequences from standard video cameras but is not restricted to this meaning. The term also comprises picture frame sequences from cameras sensible for other wavelength like infrared-, heat- or ultraviolet-cameras. Alternatively picture frame sequences which can be used in connection with the invention are also produced by radar-, lidar-, ultrasonic- or laser-surveillance-systems. Especially the invention can be applied in various domains, like sport videos, home multimedia and video surveillance. The trajectory is defined as a first set of location points, preferably expressed in two-dimensional coordinates, which represents the position of the object in the pictures of the frame sequence preferably over the object's lifetime or appearance in the picture frame sequence. Preferably the set of location points comprises one location point per frame.

In a further step the extracted trajectory is pre-processed to a pre-processed trajectory by applying a spatial correlation filter algorithm. The spatial correlation filter uses as an input the first set of location points and returns as an output a second set of location points, whereby the number of location points of the second set is smaller than the number of the first set. Preferably each location point of the second set corresponds to a frame of the picture frame sequence. Preferably the spatial correlation filter algorithm filters all location points which do not show a significant displacement of the object compared to a previous point, especially the directly preceding location point of the second set of location points.

The pre-processed trajectory is stored in a database, preferably together with other pre-processed trajectories of other objects and/or other picture frame sequences. Preferably the location point data is linked with the respective picture frame data.

In a further step search queries are applied indirectly or directly on the pre-processed trajectory and/or on the database, especially on the second set of location points. Preferably the possible searches comprise queries on location, speed, trajectories etc.

The claimed method comprises the advantage that search queries are performed on a reduced data volume compared to the systems as known from the prior art. Therefore the search time on large picture data sets is reduced significantly. This advantage is achieved by sampling of object behaviour independent of the frame rate of the picture frame sequence and/or providing a representation model of the trajectory data which minimises the amount of database entries to search through. Preferably the method realises a content management system using video content analysis to generate video descriptions for fast searching in order to provide search capabilities on a human-meaningful semantic level.

In one embodiment the extracting step comprises applying object segmentation and/or object-detection and/or tracking algorithms on the picture frame sequence. Preferably algorithms are used as described in the paper from W. Hu, T. Tan, L. Wang and S. Maybank, "A survey on visual surveillance of object motion and behaviours" IEEE Transactions on SMC-C, vol. 34, no. 3, pp. 334-352, August 2004. The disclosure of this paper, especially concerning the algorithm, is incorporated herein by reference in its entirety. Preferably the algorithms return object bounding boxes on a frame-by-frame basis, whereby for example the center of the bounding boxes are used as the location of the object in the respective frame.

In another embodiment the pre-processing step comprises removing location points of the extracted trajectory representing a linear and/or a substantially linear extra- and/or interpolation behaviour in the image plane of the picture frames. Especially locations points which show no or only a linear displacement compared to the previous location point are excluded in the pre-processing step.

In yet another embodiment the filtering of the first set of location points comprises eliminating non-relevant location points. A possible practical realisation is a two-dimensional adaptive form of the piecewise aggregate approximation (PAA) as disclosed in E. J. Keogh and M. J. Pazzani: "A simple dimensionality reduction technique for fast similarity search in large time series databases" in Proc of the 4th Pac.-Asia Conf. on Knowledge Discovery and Data Mining, April 2000, pp. 122-133. The disclosure of this paper, especially concerning the algorithm, is incorporated herein by reference in its entirety. Preferably the relevance of a location point is estimated by two criteria, which are the distance to the directly preceding location point or directly preceding filtered location point and the deviation of the moving direction of the object compared to the directly preceding location point or directly preceding filtered location point.

In a further embodiment the method comprises an indexing step to enable a fast searching data access method without processing the complete dataset. Preferably the indexing step produces a so-called R-tree or improved R*-tree. For the realisation of the trees reference is made to the paper from N. Beckmann, H. -P. Kriegel, R. Schneider, B. Seeger: "The R*-tree: An efficient and robust access method for points and rectangles" in Proc. of ACM SIG-MOD Int. Conf. on Management of Data, May 1990, pp. 322-331. The disclosure of this paper, especially concerning the R*-tree, is incorporated herein by reference in its entirety. Preferably the indexing step comprises grouping the filtered trajectory location points into sub-trails and representing each sub-trail with a minimum bounding rectangle. Preferably the sides of the rectangles are parallel to the sides of the images of the picture frames.

In yet another embodiment the query is a search for object-trajectories, which match with a sketched line. The sketched line is for example drawn by the user with a computer device like a mouse on a image of the picture frame sequence or on a reference image. Alternatively the query is a search for objects which cross a user draw-able or selectable tripwire and/or a search for objects located in or passing through an indicated area of interest.

Preferably the sketched line is converted into line segments and the line segments, and/or range windows adapted to the line segments defining a limited matching range, are converted into search minimum bounding rectangles. In a preferred embodiment the database is accessed after defining the search minimum bounding boxes, whereby only rectangles and/or minimum bounding rectangles of the database, especially of the R- or R*-tree, overlaying or overlapping with the search minimum bounding box are accessed.

In a preferred embodiment the closeness of a match and/or the correlation between the sketched line and a retrieved trajectory from the database is weighted by the Euclidean point-to-line distance and/or by the difference between the direction of the sketched line and the direction of the retrieved trajectory. Preferably the direction of the sketched line and/or of the retrieved trajectory is the moving direction of an object along the sketched line or along the trajectory.

In case the sketched line comprises more than one line segment it is preferred that each segment is searched and weighted separately in a sequential order. Furthermore it is possible to implement a rank-join algorithm, which provides a preliminary and/or final global ranking or best-match-order of the retrieved trajectories. The rank-join algorithm depends among others on the ratios between the length of the individual line segments.

Preferably the method is realised as a computer program as claimed in claim 10. Preferably the invention is realised by a tracking and data retrieval system which is adapted to execute the method according to the invention. Especially the tracking and data retrieval system comprises a database server adapted to perform the extracting, pre-processing and storing steps and preferably the indexing step and a retrieval client adapted to formulate and/or send search queries to the database server. The processes for the trajectory retrieval are preferably performed by the database server.

BRIEF DESCRIPTION OF THE DRAWINGS

For a more complete understanding of the present invention, and the advantages thereof reference is now made to the following descriptions taken into conjunction with the accompanying drawings, wherein similar numbers designate the same object. The drawings show.

DETAILED DESCRIPTION

Figure 1:
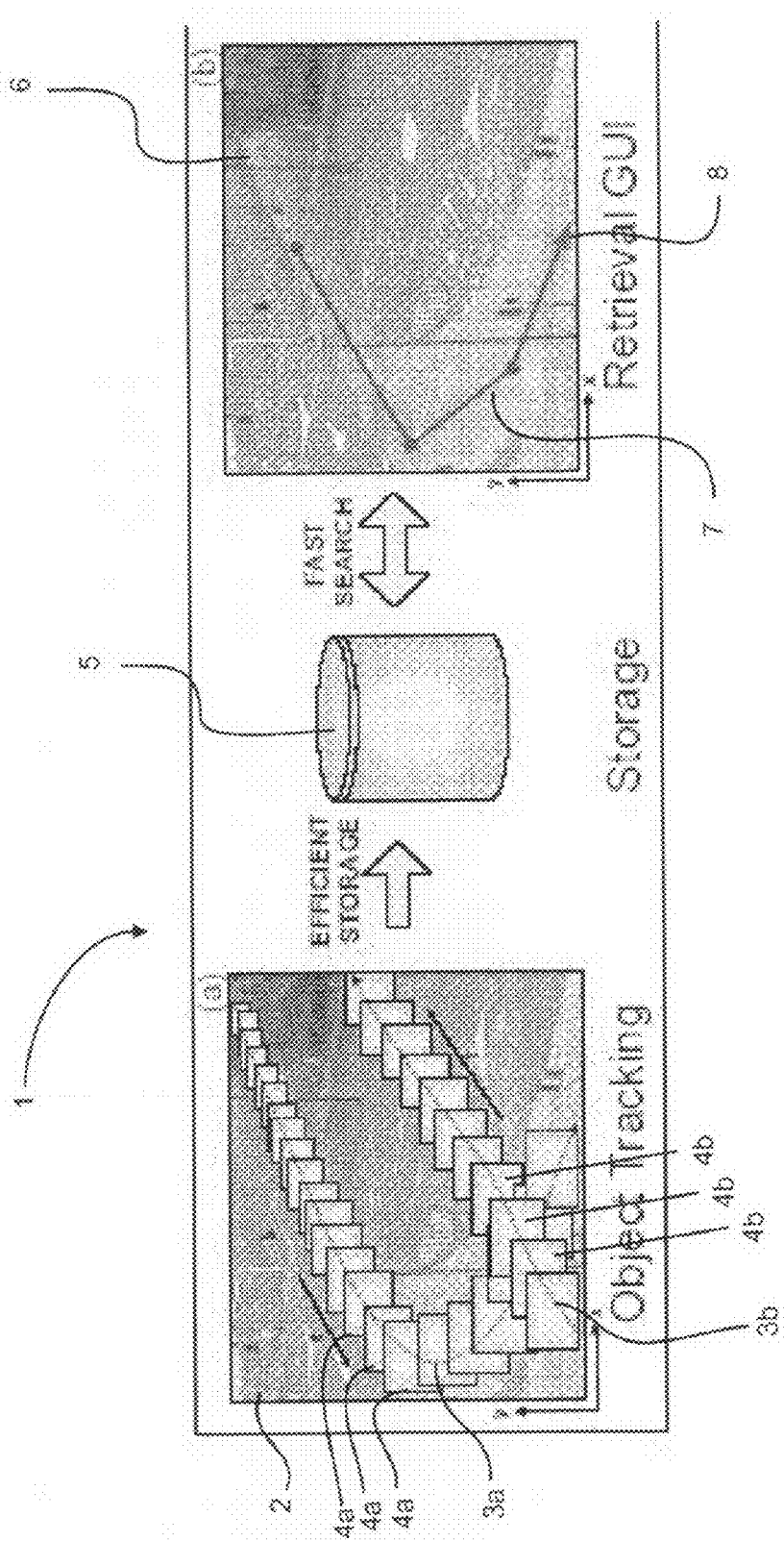
FIG. 1 A schematic overview of a tracking and data retrieval system as a first embodiment of the invention.

FIG. 1 shows a schematic overview of the general concept of a tracking and data retrieval system 1.

On the left hand side of FIG. 1 object tracking is illustrated by means of an image 2 of a traffic crossing with overlaid trajectories 3a and b and object detection windows 4a and 4b. In the image 2 two lines are shown representing two trajectories 3a and b of two different moving objects. The trajectories 3a and b are extracted from a sequence of video frames, whereby in a first step a segmentation algorithm returned the shape of each of the moving objects and in a second step the shape of the moving objects and therefore the moving objects themselves were detected in all video frames of the sequence. The location points of the moving objects in the video frames are used to form the trajectories 3a, b, whereby the trajectories 3a and b are interpolating the centre of object detection windows 4a and 4b respectively, which are object bounding boxes on a frame-by-frame basis. These trajectories 3a, b each being represented by the set of the trajectory-forming location points are filtered and stored in a database 5 as explained later.

On the right hand side image 6 of the traffic crossing is shown, which is similar or identical to the image 2. In image 6 sketched line-segments 7 are drawn, with one end realised as arrowhead 8. The sketched line 7 represents a trajectory for a search query on the database for similar trajectories and is sent for a search to the database 5. The arrowhead 8 indicates the moving direction of an object in connection with the search trajectory.

Figure 2:
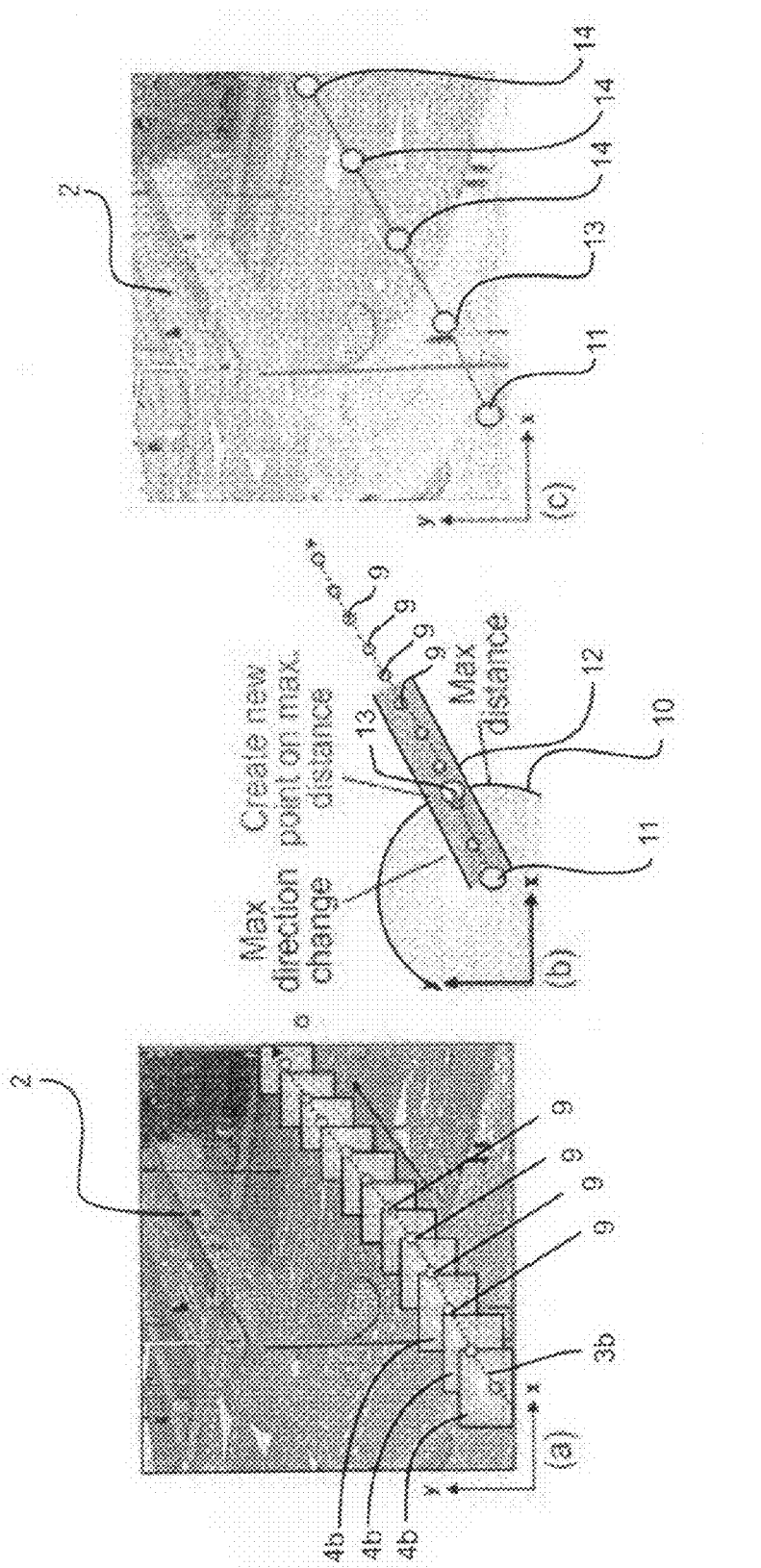
FIG. 2 a schematic overview to illustrate extracting and filtering of trajectories as preferably used in the tracking data and retrieval system.

FIG. 2 illustrates schematically the extracting and filtering of the trajectory 3b as preferably used in the tracking data and retrieval system 1 in FIG. 1. On the left hand side—again—is the image 2 with the trajectory 3b, the bounding boxes 4b and additionally a set of locations points 9, each representing the centre of a bounding box 4b corresponding to a single frame of the frame sequence. This set of location points 9 is the input for a filtering algorithm as illustrated in the middle of FIG. 2. The set of location points 9 are filtered by a spatial correlation algorithm, whereby all location points which are within a predetermined maximum distance defined by a circle 10 around a preceding filtered location point 11 and/or which are within a maximum direction deviation range defined by a tube 12, which is arranged around the location points 9, are cancelled.

Optionally new location points 13 can be created in case no location point 9 of the trajectory 3b lies on the circle 10 and the currently considered trajectory point lies outside the circle 10, and/or a new point can be created on the edge of tube 12 in case the currently considered trajectory point lies outside the tube 12. The output of the filtering algorithm is represented on the left side of FIG. 2 showing a smaller set of location points 11, 13, 14 representing the trajectory 3b.

Figure 3:
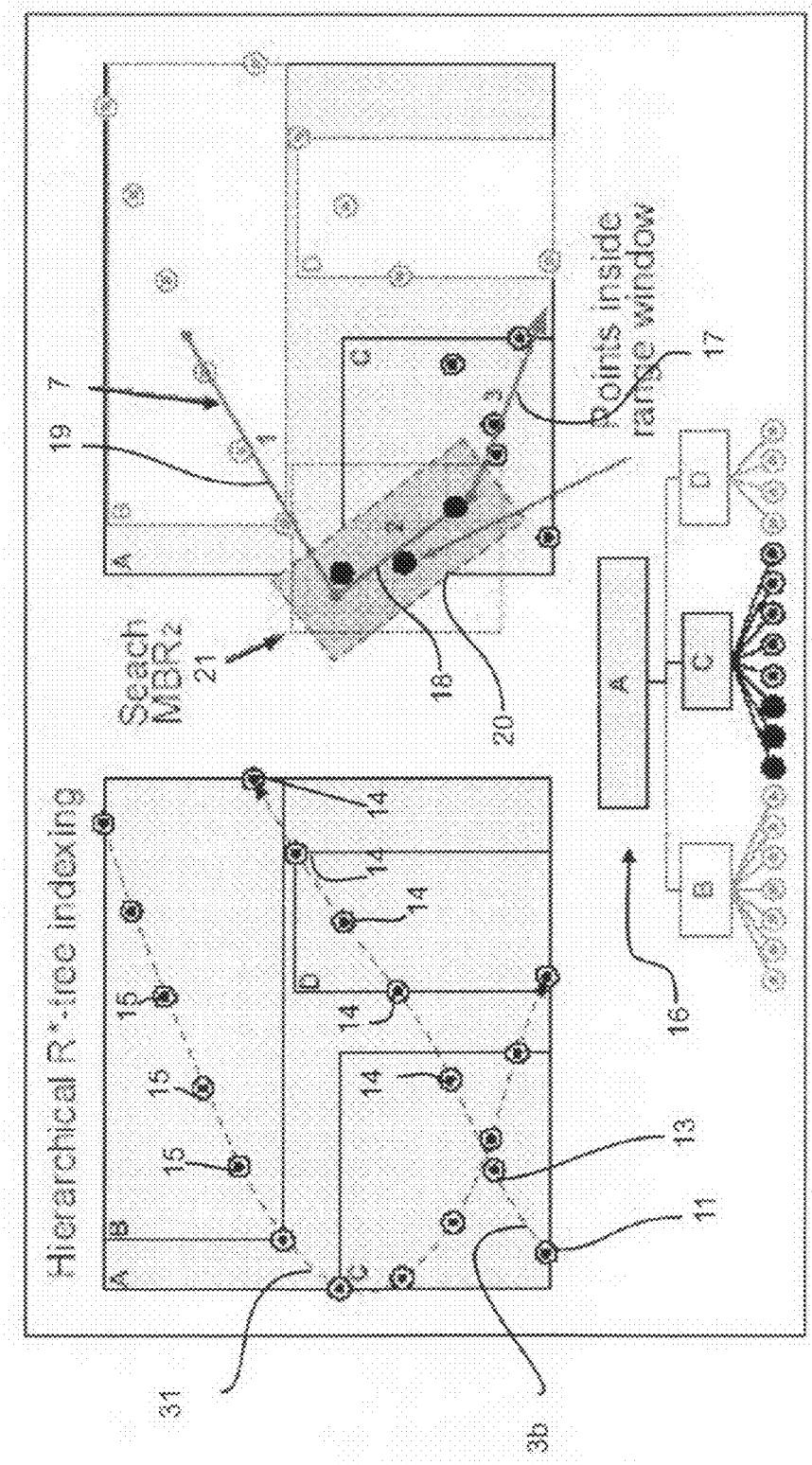
FIG. 3 a schematic overview of the hierarchical storing of the filtered or pre-processed trajectory and of the retrieval thereof.

FIG. 3 illustrates the hierarchical storage of the filtered trajectory data in the database and the database access method.

In the upper left corner of FIG. 3 the filtered trajectories 3a and b with filtered location points 11, 13, 14 and 15 respectively are shown. Each trajectory 3a and b is represented by a first minimum bounding rectangle A, which only carries the information about the outer limit and the position of the complete filtered trajectories 3a and b. In a further step the filtered trajectories 3a, b are split up into sub-trails which are represented by minimum bounding rectangles B, C and D respectively, whereby preferably the rectangles B,C and D are arranged within the rectangle A without overlap. The rectangles B, C, D carry the information about the outer limit and the position of the respective sub-trails arranged therein.

In the lower part of FIG. 3 a tree-like data structure 16 is shown which is also known as R*-tree. The data structure 16 is indexed by the rectangles A, B, C and D and carries the information about the trajectories and sub-trails.

In the upper right corner of FIG. 3 the database access method in case of a query on the basis of the sketched line-segments 7 concerning a trajectory is demonstrated. First the sketched line-segments 7 are divided in segments 17, 18 and 19. In the following the database access method in connection with the middle line segment 18 is described as an example. In a further step a range window 20 is placed automatically over the middle segment 18 to define a limited matching range. In a subsequent step the range window 20 is converted into a search minimum bounding rectangle 21. The search for matching trajectories and/or sub-trails of trajectories is only performed in the rectangles of the tree-like data structure 16 overlaying the search minimum bounding box, which are—for the example segment 18—the rectangles A and C. Trajectory data concerning the rectangles B and D is not accessed.

The search for matching trajectories and/or sub-trails is carried out for all segments 17, 18 and 19 of the sketched line-segments 7. Finally as a result a list of trajectories in best-match order is returned.

Figure 4:
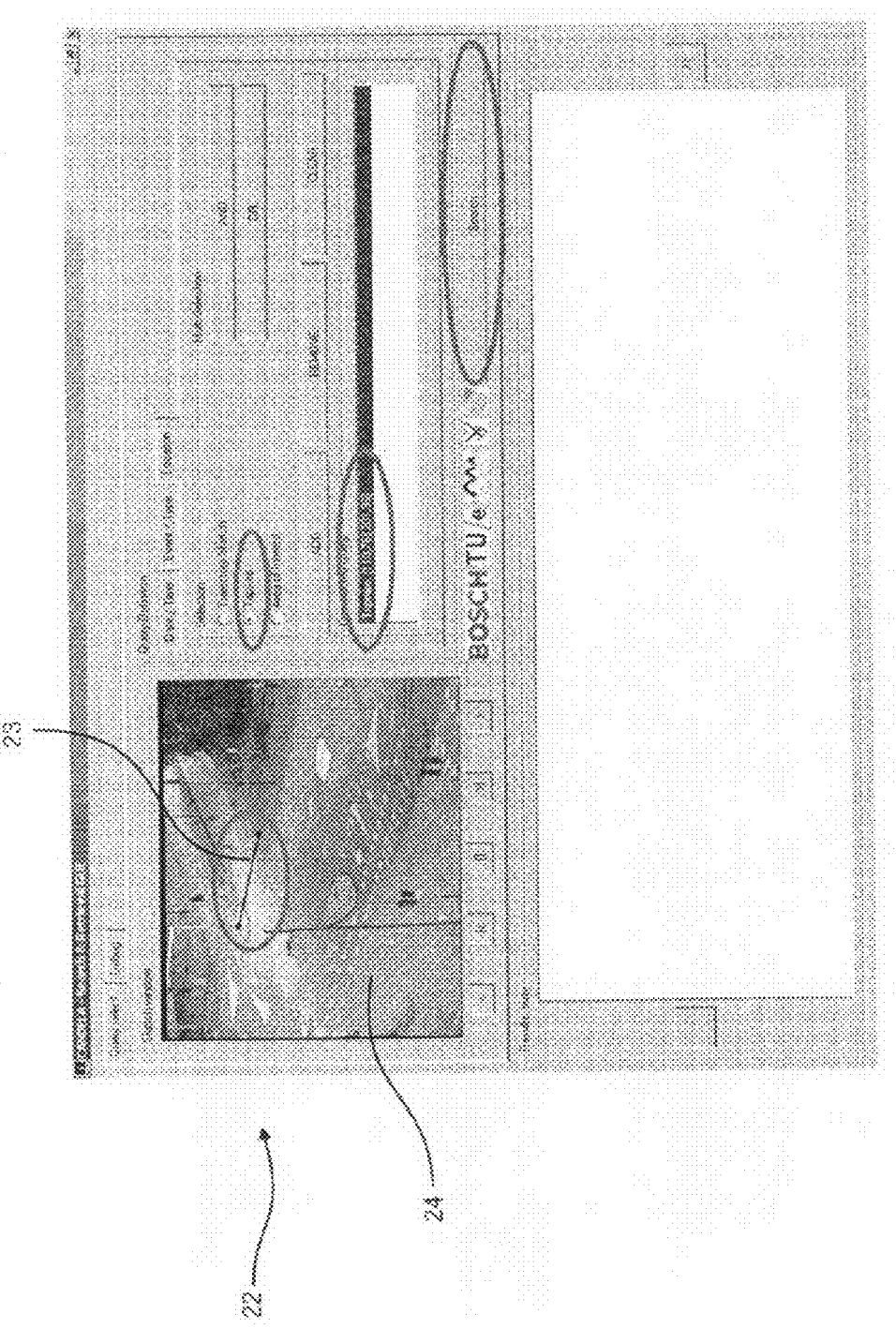
FIG. 4 an embodiment of a graphical user interface (GUI) used in connection with tracking and data retrieval system in FIG. 1 during a tripwire query.

FIG. 4 shows an embodiment of a graphical user interface GUI 22 used in connection with the present invention, especially as a retrieval client. The GUI allows three different queries, which concern a trajectory sketch as already described above, a tripwire and an area of interest.

Figure 5:
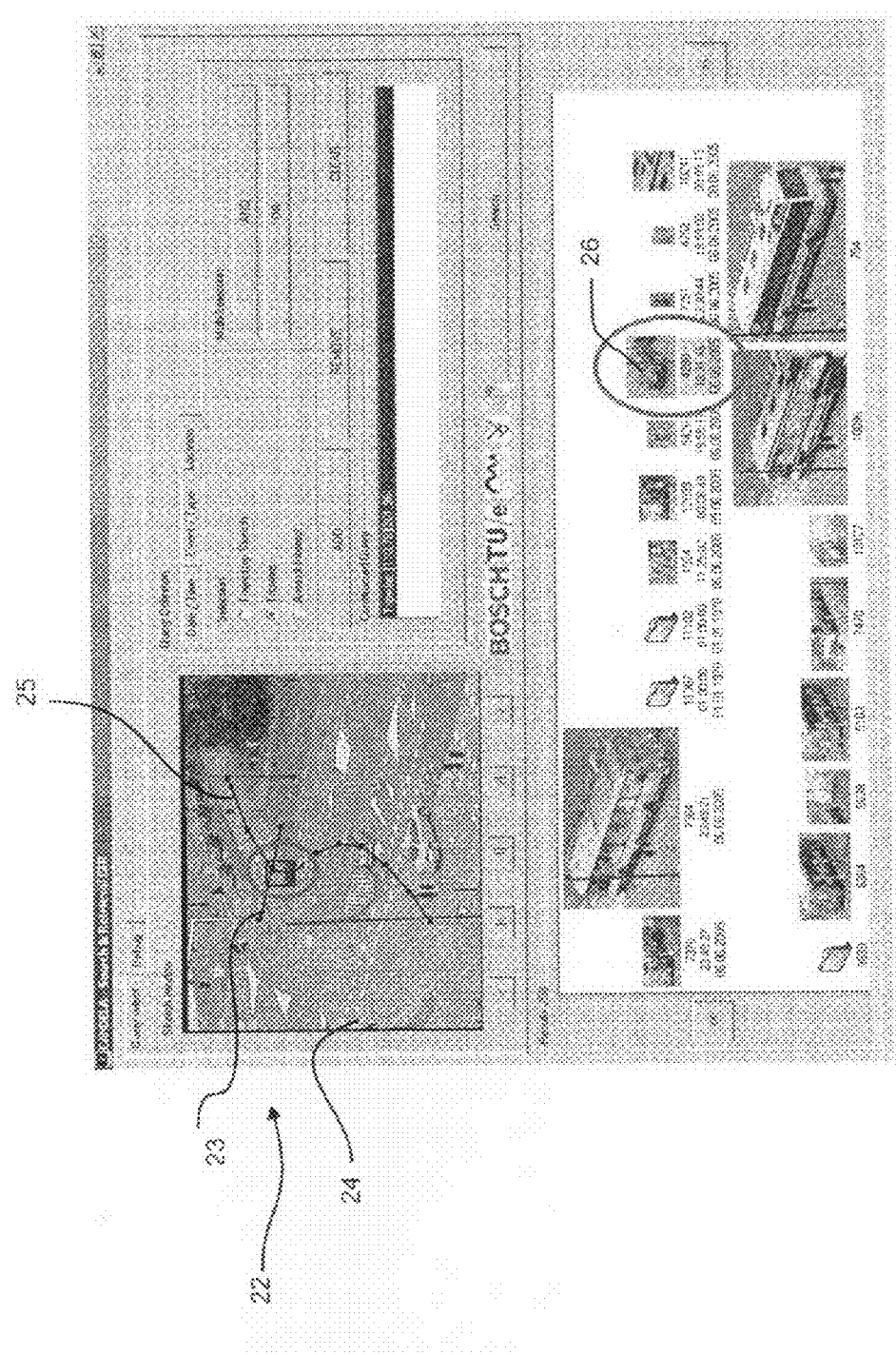
FIG. 5 the GUI during presenting the retrieved data as a response to the tripwire query.

The tripwire modus permits the user to draw a line 23 as a tripwire preferably in an arbitrary shape in an image 24, whereby as a result of the tripwire query all objects and/or trajectories are retrieved from the database 6 (FIG. 1) which crossed the line during the recorded observation time or during a (user-) specified time interval. The search is carried out analogously as described above in connection with the sketched line with the difference that the closeness of the match of retrieved trajectories or sub-trails is weighted by other criteria. FIG. 5 shows the GUI 22 of FIG. 4 with the search results, whereby in the lower part of the GUI 22 all objects which crossed the tripwire are listed. By selecting one of the objects, in the present case a car 26, the trajectory 25 of the car 26 is displayed together with the tripwire line 23 in the image 24.

Figure 6:
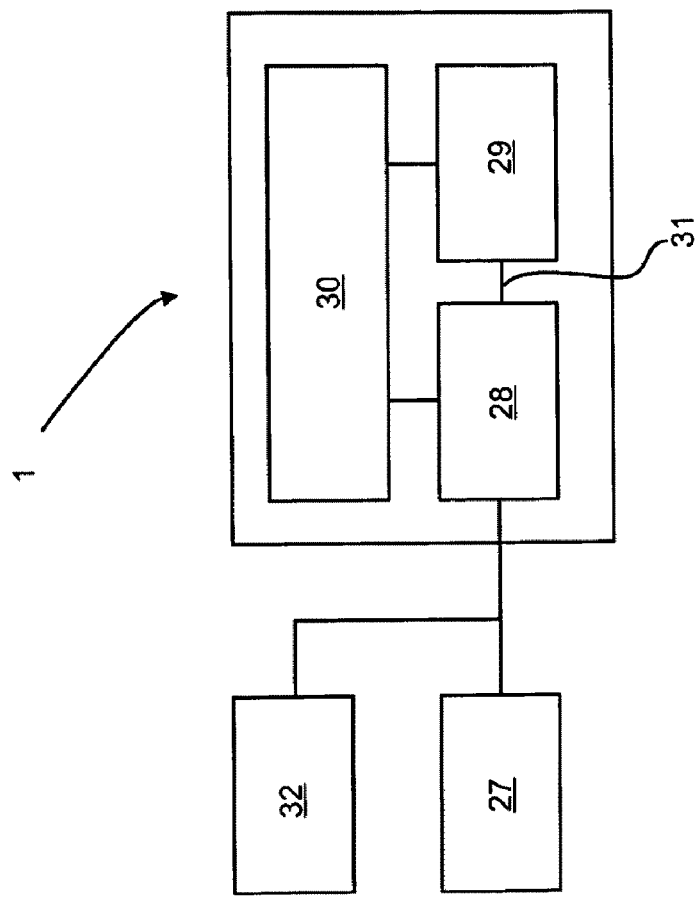
FIG. 6 an embodiment of a hardware architecture of the tracking and data retrieval system in FIG. 1.

FIG. 6 demonstrates an embodiment for a hardware architecture for the tracking and data retrieval system 1 in FIG. 1. The tracking and data retrieval system 1 is realised as one or more computers which is or are connected to one or several video cameras 32 and/or to one or more databases 27 like video cassette recorders or memory devices, containing video sequences. The data and retrieval system 1 comprises a server 28 being responsible for the extracting, pre-processing, indexing and storing the trajectories of moving objects in video frame sequences from the video cameras 32 or databases 27 and a client 29 responsible for defining and sending search queries to the server 28. Server 28 and client 29 use a software program 30 for implementing the functionality of both the server 28 and the client 29 and for performing the method of content-management as described above. Server 28 and client 29 are connected via a link 31 which is realised as a software link within one single computer or a physical link like a network or internet connection.

The invention claimed is:

1. A method for searching image information comprising the steps of:
    extracting a trajectory of an interesting object in a picture frame sequence,
    pre-processing the extracted trajectory to a pre-processed trajectory by a reduction to relevant location points, whereby the relevance of location points is defined by a first criteria of a maximum distance between two filtered location points and by a second criteria of a maximum deviation of a moving direction of the object between two filtered location points,
    storing the pre-processed trajectory as data in a database,
    applying search queries on the pre-processed trajectory data of the database, and
    indexing the pre-processed data of the extracted trajectory by grouping the pre-processed data into sub-trails and representing each sub-trail with a minimum bounding rectangle.

2. The method according to claim 1, whereby the trajectory is represented by a first set of location points in the picture frames.

3. The method according to claim 1, whereby pre-processing is accomplished by applying a spatial correlation filter algorithm, which reduces the number of location points, whereby the pre-processed trajectory is represented by a second set of location points in the picture frames.

4. The method according to claim 1, whereby the extracting step comprises applying object-detection and/or tracking algorithms on the picture frame sequence.

5. The method according to claim 1, whereby the pre-processing step comprises removing location points of the extracted trajectory representing a linear and/or a substantially linear extra- and/or interpolation behaviour of the object in the image plane of the picture frames.

6. The method according to claim 1, whereby the indexing step further comprises storing the minimum bounding rectangles in a hierarchical and/or tree-like index structure.

7. The method according to claim 1, whereby the query is a search for object trajectories, which match with sketched line-segments and/or is a search for objects, which cross a user draw-able tripwire and/or is a search for objects located in an indicated area of interest.

8. The method according to claim 7, whereby the query is applied off-line without using the actual video data.

9. The method according to claim 7, whereby the sketched line is converted into separate and/or independent line segments and the line segments and/or range windows adapted to the line segments defining a limited matching range are converted into search minimum bounding rectangles.

10. The method according to claim 7, whereby the closeness of a match and/or the correlation between sketched line-segments and a retrieved trajectory of the database is weighted by the Euclidean point-to-line distance and/or by the difference between the direction of the sketched line-segments and the direction of the retrieved trajectory.

11. A computer program product, the computer program product comprising a tangible storage medium readable by a computer processor and storing instructions for execution by the computer processor for performing all the steps of claim 1.

* * * * *